UNITED STATES PATENT OFFICE.

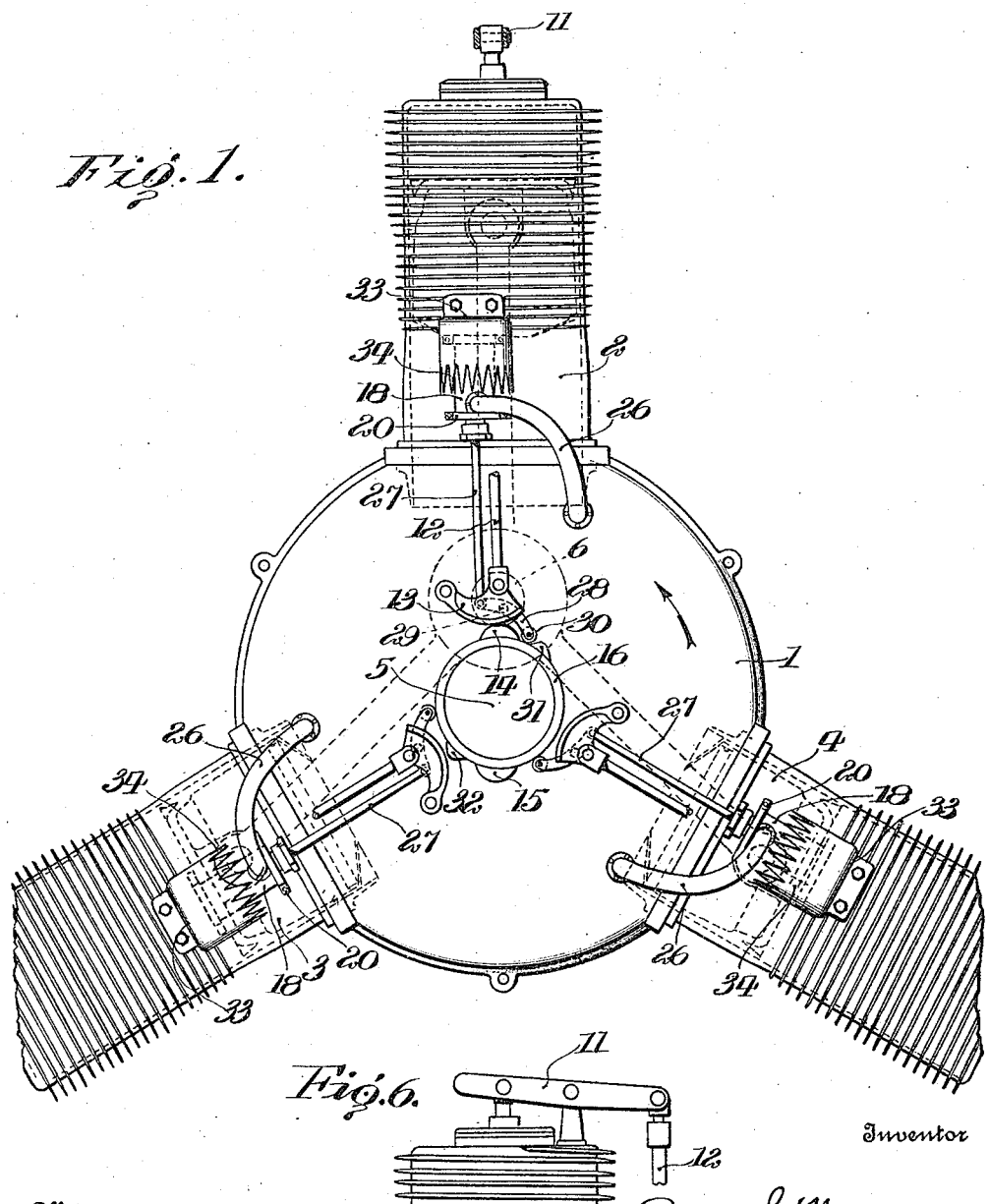

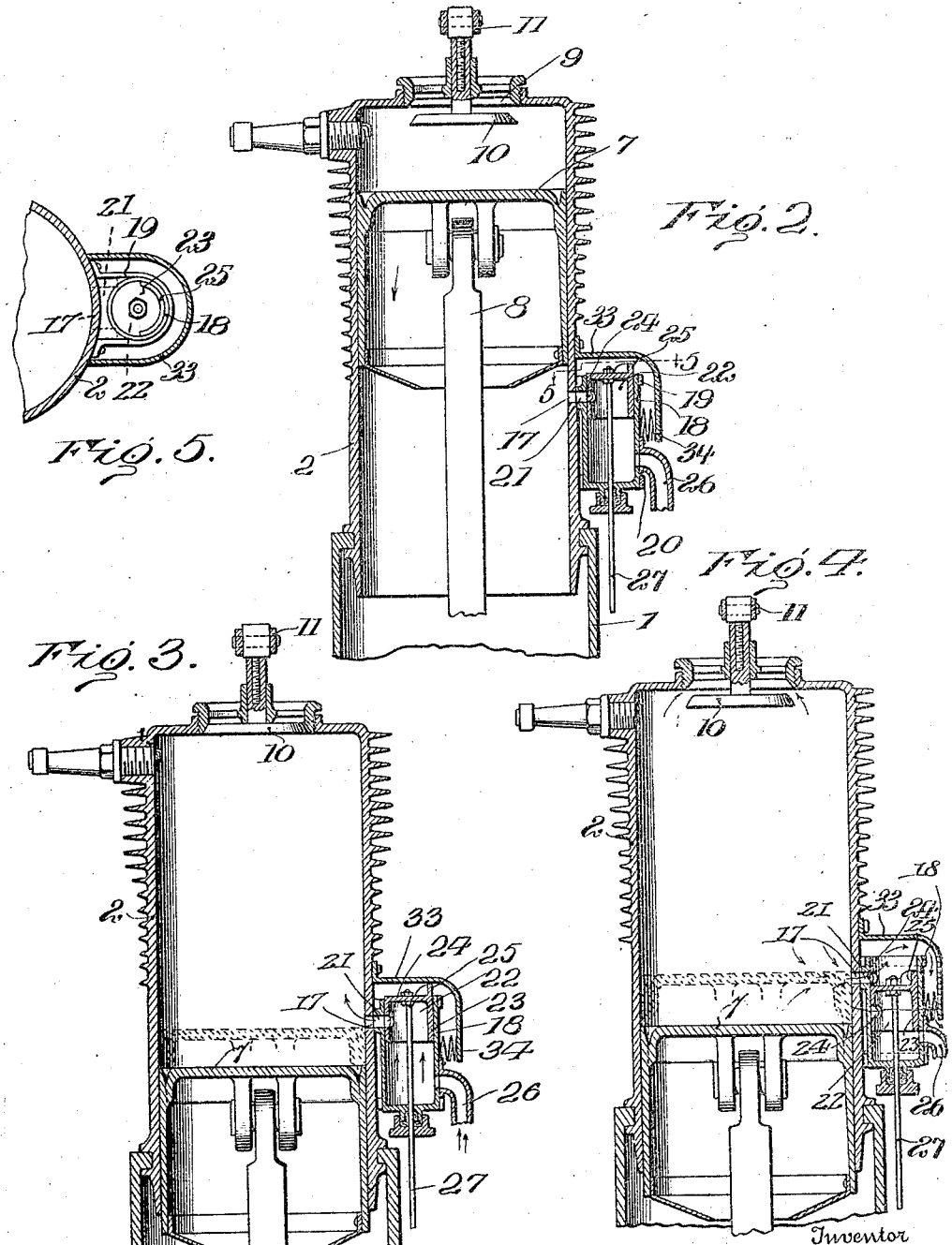

ROBERT S. MOORE, OF WASHINGTON, DISTRICT OF COLUMBIA, ASSIGNOR TO GYRO MOTOR COMPANY, OF WASHINGTON, DISTRICT OF COLUMBIA, A CORPORATION OF DELAWARE.

ROTARY GAS-ENGINE.

1,293,508.　　　　　Specification of Letters Patent.　　Patented Feb. 4, 1919.

Application filed February 13, 1914.　Serial No. 818,518.

*To all whom it may concern:*

Be it known that I, ROBERT S. MOORE, a citizen of the United States, residing at Washington, in the District of Columbia, have invented certain new and useful Improvements in Rotary Gas-Engines, of which the following is a description, reference being had to the accompanying drawing and to the figures of reference marked thereon.

The invention relates to new and useful improvements in gas engines, and more particularly to gas engines wherein the cylinders are mounted for rotation.

An object of the invention is to provide a gas engine wherein the cylinder has an intake port adapted to be uncovered by the piston, with means for controlling said intake port whereby it is connected with a fuel supply during the period of intake, and wherein said intake port is open to the atmosphere during the period of exhaust, so as to prevent any possible back-firing into the fuel supply chamber, and so that said intake port may be utilized as an auxiliary exhaust port.

A further object of the invention is to provide devices for controlling the intake port in an engine of the above character, which devices are so controlled that the intake port is connected with the fuel supply chamber by a free and unobstructed passage at the time when the piston uncovers said intake port.

A further object of the invention is to provide means whereby the exhaust gases passing through the intake port on the exhaust, are conducted about the intake pipes for the purpose of heating the same, said deflector for the exhaust gases being also so constructed as to serve as a muffler.

These and other objects will in part be obvious, and will in part be hereinafter more fully disclosed.

In the drawings, which show by way of illustration one embodiment of the invention,—

Figure 1 is a side view of an engine having my improvements applied thereto;

Fig. 2 is a longitudinal sectional view through one of the cylinders and a part of the casing, showing the piston on the beginning of its suction stroke;

Fig. 3 is a similar view, showing the piston on the beginning of its compressing stroke;

Fig. 4 is a similar view, showing the piston on the beginning of its exhaust stroke;

Fig. 5 is a sectional view on the line 5—5 of Fig. 2;

Fig. 6 is a detail, showing the lever for operating the exhaust valve.

The invention consists generally in providing an engine cylinder with an intake port which is so disposed as to be uncovered by the piston during its stroke. This intake port is preferably disposed some distance from the extreme inner position of the piston. The intake port is connected with a fuel supply chamber by devices which are so constructed and operated that the passage leading to the supply chamber from the intake port is closed, and said intake port opened to the atmosphere upon the expansion stroke of the piston, so that as the piston passes said intake port, said intake port may operate as an auxiliary exhaust port. These devices for controlling the intake port are, however, so operated that the passage leading from the intake port to the fuel supply chamber is established before the piston passes the intake port on its suction stroke, so that the passage is free from any valves or other obstructions, and the fuel gases are permitted to pass quickly into the cylinder as the piston uncovers said intake port.

The device for controlling the intake port is operated by suitable cams carried by a sleeve, which in a multiple cylinder rotary engine travels in the same direction as the cylinders, but at a differential speed relative thereto, so that the intake ports of the various cylinders may be controlled in proper timing for the intake period and for the exhaust of the respective cylinders.

Referring more in detail to the drawings, the invention is shown as embodied in a rotary gas engine, which has a casing 1 supporting three cylinders 2, 3 and 4. This rotating casing is mounted to rotate about a suitable fixed shaft 5, which carries a crank 6. Each cylinder is provided with a piston 7, connected by a piston rod 8 with the crank 6.

As herein shown, each cylinder is formed with a main exhaust port 9, which is controlled by a valve 10. This valve 10 has a stem sliding in a suitable bearing, and the stem is pivoted to a lever 11, fulcrumed between its ends on a bracket carried by the cylinder. The other end of the lever is connected to a rod 12 attached to an arm 13 adapted to coöperate with cams 14 and 15 carried by a sleeve 16. This sleeve 16 is mounted so as to rotate on the fixed shaft 5, and is driven at a differential speed relative to the casing 1, as is well understood in this type of engine.

Each cylinder is provided with an intake port 17. This intake port, as clearly shown in Fig. 3, is located some distance above the extreme inner position of the piston 7. The controlling devices for this intake port consist of a cylindrical casing 18, strapped to the cylinder by straps 19 and 20. These straps are bolted to the cylinder. Said casing is formed with suitable faced lugs, which rest against the side wall of the cylinder and the casing is also formed with an opening 21 which registers with the intake port 17.

As shown in Fig. 3, the intake port 17 and the opening 21 are of considerable extent circumferentially of the cylinder, so as to form a relatively large intake passage. Located within the casing 18 is a piston 22. This piston is closed at its upper end and is formed with a downwardly projecting flange 23, having an opening 24 in the side wall thereof, adapted to register with the opening 21 in the casing, when the head of piston 22 is raised to the position shown in Fig. 3. The flange between the opening 24 and the end of the piston 22 is of sufficient extent to span the opening 21 when the piston 22 is moved downward.

Located on the outer end of the piston 22 is a deflector 25. The casing 18 is connected by a pipe 26 with a supporting casing 1, as herein illustrated. The supporting casing 1 is utilized as a fuel supply chamber. It will be understood, however, that the fuel may be supplied from other sources, and the connection with the casing which supports the cylinder is selected solely for the purpose of illustration of one embodiment of the invention. It is understood, of course, that there is a casing 18 for each cylinder located adjacent the intake port thereof.

A rod 27 is connected to the piston 22, and this rod 27 is in turn pivoted to a lever 28 (see Fig. 1), fulcrumed at a point between its ends, as indicated at 29. The other end of this lever carries a roller 30 adapted to coöperate with the cams 31 and 32 on the sleeve 16. It will be understood, of course, that the arms 13 controlling the exhaust valves, are located at one side of the levers 28, which control the piston for the intake ports. The piston 22 is moved outwardly when released by the cam by centrifugal force. Springs may, however, be used to assist in this movement of the piston. These cams 31 and 32 are located just in rear of the main exhaust control cams 14 and 15, and rotate in timed relation thereto as they are carried by the same sleeve 16. They are also given a differential movement relative to the rotation of the engine casing, so they are brought into proper timed relation to the movement of the pistons for opening the intake port during the intake period, and for closing the passage leading to the intake port during the exhaust period for each cylinder.

A cup or deflector 33 is attached to each cylinder adjacent the casing 8, and extends down over the same. The lower edge of this deflector is formed with notches 34, which are preferably V-shaped and extend some distance into the deflector.

In describing the operation of my device, I will refer to the main piston 7 as moving in the cylinder, it being understood, of course, that in a rotary engine the cylinder moves relative to the piston. Starting with the parts in the position shown in Fig. 2, the piston is on the first part of its suction stroke. The main exhaust valve 10 is open, so air is drawn into the cylinder. This exhaust valve is timed so as to close before the main piston reaches the intake port 17, so that a slight vacuum may be created in the engine cylinder. During this travel of the main piston relative to the cylinder, the piston 22 controlling the intake port is in the position shown in this figure, as the lever for controlling this piston is bearing on the sleeve and is off from the controlling cams.

As soon as the piston head 7 of the cylinder passes the intake port 17, fuel will be drawn into the cylinder direct from the fuel supply chamber which is the casing 1. At this time when the piston 22 for controlling the passage leading to the intake port is in the raised position, there are no valves or obstructions of any character between the supply chamber and the intake port, and the fuel will rush freely into the cylinder. In a rotary engine, the centrifugal force will assist in carrying the fuel through into the cylinders. As the piston 7 begins its outer stroke, the fuel gases in the cylinder will be partly returned through the intake port to the fuel supply chamber.

The amount of gas returned to the supply chamber may be controlled by moving the controlling piston 22 so as to close the intake port, and thereby the compression in the cylinder can be slightly varied. In order that this may be readily accomplished, the cams for operating the intake port controlling devices may be mounted so they may be shifted manually relative to the traveling of the cylinder.

A continued upward movement of the piston, compresses the gases in the cylinder, and upon firing the gases, the piston again moves downward relative to the cylinder, the gases expanding. While the piston 7 is on its downward movement, the cam 31 is brought into engagement with the lever 28, which depresses the end of the lever connected with the rod 27, and this draws the piston 22 downwardly, and the downward movement of said piston 22 closes the passage leading to the fuel supply chamber and opens the intake port to the atmosphere. This movement of the piston 22 is fully accomplished before the main piston head 7 passes the intake port. As soon as the main piston head 7 passes the intake port, there is an auxiliary exhaust through this intake port.

In other words, the shifting of the controlling piston 22 for the intake port has converted said intake port into an auxiliary exhaust port, and has at the same time closed the passage leading from the intake port to the fuel supply chamber.

The exhaust gases through the intake port are caught by the cup or deflector 33 and carried down around the casing 18, which serves in a measure to heat the casing 18 and increase the efficiency of the supply of the gases to the cylinder. The lower end of this deflector is shaped so as to relieve the gases in such a way as to serve as a muffler. As soon as the piston has passed its auxiliary port on the down stroke, the main exhaust valve is opened, and an upward movement of the piston will force the burnt gases out through the main exhaust port. As soon as the piston has passed above the combined intake and auxiliary exhaust ports, the controlling piston 22 is again shifted, so as to connect the intake port with the fuel supply chamber.

By the above construction, where the passage leading to the fuel supply chamber from the intake port is closed, and said intake port is open to the atmosphere, there is no possible chance of any spark or hot gases being forced into the fuel supply chamber and causing a firing therein.

I have, therefore, not only provided controlling devices for the intake port, which practically form a valveless passage between the intake port and the supply chamber, but I have also provided means for absolutely preventing any possible chance of backfiring through the intake port.

In Fig. 1 of the drawings, I have shown a rotary gas engine having three cylinders. It will be understood, of course, that other arrangements of the cylinders may be provided without departing from the spirit of the invention, as set forth in the above description and in the appended claims. The cylinder indicated at 2 in this figure, is in suction position. As the piston head moves downward relative to the cylinder during the rotation of the engine, the cam 31 will engage the lever 28, and shift the controlling piston 22 therefor, so as to open the intake port to the fuel supply. When the piston 7 reaches the position shown in dotted lines in Fig. 3 the intake takes place and when the position shown in full lines has been reached the full intake has occurred. The main piston then moves outward compressing the gases and, when they are fully compressed, the firing takes place. The power stroke forces the main piston back and when it reaches the intake port this has been coverted into an auxiliary exhaust port by the movement of the piston 22 downward. This is shown in Fig. 4 by the dotted lines. The piston 7 continues on its downward stroke and the main exhaust then opens; the main piston being then in the position shown in full lines in Fig. 4. In other words, as shown in Fig. 2, the cycle of operation is supposed to start and, in the downward movement of the main piston, air is drawn in through the main exhaust port which has been left open from the preceding exhaust stroke. When the main piston reaches the position shown in dotted lines in Fig. 3, the main exhaust has been closed and the intake of fuel begins through the port 17. When the main piston has reached the position shown in full lines in Fig. 3, the full intake has taken place. Then occurs the compression stroke of the main piston and the firing stroke at the completion of the compression stroke. When the piston reaches, on the firing stroke, the position shown in dotted lines in Fig. 4, the intake port 17 has been converted into an auxiliary exhaust port and as the main piston continues downward to the position shown in full lines in Fig. 4, the main exhaust has opened. The outward movement then of the main piston scavenges the cylinder of the remaining burnt gases.

It is understood that the cams for controlling the piston 22, which in turn control the intake ports, are so disposed that the cylinders are fired one after another.

The lever 28 for moving the piston 22 is fulcrumed intermediate its ends, and, therefore, the centrifugal force operating upon the piston 22 and the moving parts during the rotation of the engine, will tend to force the lever into contact with its operating cam. A spring may be used also for holding the lever in proper coöperative relation with the cam and sleeve, if desired.

It is obvious that minor changes in the details of construction and arrangement of parts may be made, without departing from the spirit of the invention as set forth in the appended claims.

Having thus described my invention, what I claim as new and desire to secure by Letters Patent, is:

1. A rotary cylinder gas engine including a cylinder, a piston for said cylinder, said cylinder having an intake port so located as to be uncovered by said piston approximately at the end of its intake stroke, a fuel supply chamber, and devices whereby said intake port may be connected to said fuel supply chamber or to the atmosphere, said devices including means for opening the intake port to the supply chamber prior to the uncovering of the same by the piston on the intake stroke.

2. A rotary cylinder gas engine including a cylinder, a piston for said cylinder, said cylinder having an intake port so located as to be uncovered by said piston approximately at the end of its intake stroke, a fuel supply chamber, and devices whereby said intake port may be connected to said fuel supply chamber or to the atmosphere, said devices including a sliding member timed so as to open the intake port to the atmosphere when the piston uncovers the same during the expansion stroke and to open the intake port to the supply chamber prior to the uncovering of the same by the piston on the intake stroke.

3. A rotary cylinder gas engine including a cylinder, a piston for said cylinder, said cylinder having an intake port adapted to be uncovered by said piston, a casing located adjacent said intake port, means for supplying said casing with fuel gases, a sliding member in said casing adapted to close said intake port to the supply and open the same to the atmosphere, said sliding member being timed so as to open the intake port to the atmosphere when the piston uncovers the same during the expansion stroke, and to open the intake port to the supply means prior to the uncovering of the same by the piston on the intake stroke.

4. A rotary cylinder gas engine including a cylinder, a piston for said cylinder, said cylinder having an intake port adapted to be uncovered by said piston, a casing located adjacent said intake port, means for supplying said casing with fuel gases, a sliding member in said casing adapted to close said intake port to the supply and open the same to the atmosphere, said sliding member being timed so as to open the intake port to the atmosphere when the piston uncovers the same during the expansion stroke, a deflector surrounding said casing and opening as a muffler for the exhaust gases passing through the intake port.

5. A rotary cylinder gas engine including a cylinder, a piston for said cylinder, said cylinder having an intake port adapted to be uncovered by said piston, a casing located adjacent said intake port, means for supplying said casing with fuel gases, a sliding member in said casing adapted to close said intake port to the supply and open the same to the atmosphere, said sliding member being timed so as to open the intake port to the atmosphere when the piston uncovers the same during the expansion stroke, a deflector surrounding said casing and operating as a muffler for the exhaust gases passing through the intake port, said deflector being extended along the side of the casing, whereby the casing is heated by the exhaust gases.

6. A rotary cylinder gas engine including in combination, a rotating cylinder, a piston for the cylinder, an intake port adapted to be uncovered by the piston, a main exhaust valve at the outer end of the cylinder, and devices for controlling said intake port, whereby the same is supplied with fuel during the intake period and whereby the same is open to the atmosphere during the expansion stroke for the auxiliary exhaust of the gases.

7. A rotary cylinder gas engine including in combination, a rotary cylinder, a piston for said cylinder, said cylinder having an intake port adapted to be uncovered by the piston, a main exhaust valve for the outer end of the cylinder, a casing located adjacent said intake port, a piston reciprocating in said casing, means for supplying fuel gases to said casing, said casing being open above the piston, said piston having an opening therethrough adapted to register with the intake port for permitting the fuel gases to pass into the cylinder, and means for reciprocating said piston in the casing, whereby the intake port is open to the fuel supply during the intake period and is open to the atmosphere above the piston through the open end of the casing during the expansion stroke of the piston.

8. A rotary cylinder gas engine including in combination, a rotary cylinder, a piston for said cylinder, said cylinder having an intake port adapted to be uncovered by the piston, a main exhaust valve for the outer end of the cylinder, a casing located adjacent said intake port, a piston reciprocating in said casing, means for supplying fuel gases to said casing, said casing being open above the piston, said piston having an opening therethrough adapted to register with the intake port for permitting the fuel gases to pass into the cylinder, means for reciprocating said piston in the casing, whereby the intake port is open to the fuel supply during the intake period and is open to the atmosphere above the piston through the open end of the casing during the expansion stroke of the piston, and a deflector located above the casing and extending over the same for deflecting the exhaust gases around the casing, said deflector being shaped so as to form a muffler for the gases.

In testimony whereof I affix my signature, in the presence of two witnesses.

ROBERT S. MOORE.

Witnesses:
GRACE P. BRERETON,
G. B. WRIGHT.

Copies of this patent may be obtained for five cents each, by addressing the "Commissioner of Patents, Washington, D. C."